Jan. 21, 1947.　　　　J. M. BURKE　　　　2,414,634
DEVICE FOR FINDING CENTERS OF AREAS
Filed July 9, 1945

INVENTOR.
Joseph Michael Burke
BY
Charles W. Mortimer

Patented Jan. 21, 1947

2,414,634

UNITED STATES PATENT OFFICE 2,414,634

DEVICE FOR FINDING CENTERS OF AREAS

Joseph Michael Burke, Newark, N. J., assignor to Allen B. Du Mont Laboratories, Inc., Passaic, N. J., a corporation of Delaware Application July 9, 1945, Serial No. 603,978

7 Claims. (Cl. 33—98)

This invention is a device for finding or indicating the center or middle point of surfaces. It is particularly useful for examining a cathode-ray tube to ascertain whether the focussed spot of an electron ray or beam strikes the center of the face or large end of the tube, and, if it does not strike the center when the beam is not deflected, how far from the center it is.

The invention is particularly applicable to a cathode-ray tube regardless of whether the beam of electrons generated at the cathode thereof is to be deflected electromagnetically or electrostatically. It is also suitable for ascertaining the center point of disc shaped objects whether the surfaces thereof are flat or curved.

It is desirable for the electron beam to lie along the axis of the tube and strike the center of the screen of fluorescent material when no signal is being applied to the beam deflecting means of the tube.

Heretofore transparent or translucent discs having two sets of ruled lines thereon lying at right angles to each other have been placed temporarily on the faces of such tubes to test whether the undeflected beams struck the centers of the screens. However, the hazard of improperly locating the test discs and the care and attention needed militated against their use, or sometimes resulted in mistakes. Besides, a different or special size disc was needed for each size of tube.

With the present invention such tubes can be very quickly tested by the user thereof to ascertain whether the beam is centered or not, without training the user or requiring skill and practice on his part. The device may be adjusted by being applied to the tubes themselves to test them so that one of the devices can be used to test a wide range of sizes of tubes.

In carrying out the invention transparent or translucent plates are pivoted together at a point short distances from their edges and are provided with pins projecting at right angles to the sides thereof in position to contact with the rim of the tube when the test is to be made. Ruled lines on these plates are caused to cross and automatically indicate where the center of the tube is. Since the beam spot on the screen can be seen through the plates the device shows instantly whether the spot is at the center of the screen by comparing the position of the spot with the point where the ruled lines cross.

The invention may be understood from the description in connection with the accompanying drawing, in which—

Figure 1:
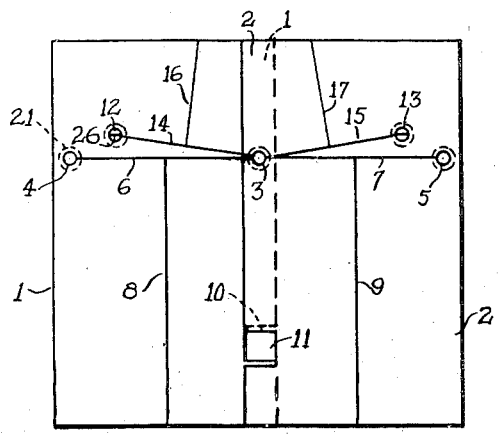
Fig. 1 is a plan view of the device.
Figure 2:
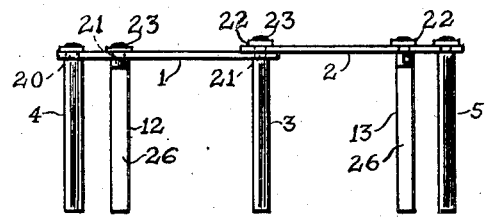
Fig. 2 is an edge view thereof.

In the drawing, reference characters 1 and 2 indicate rectangularly shaped plates of transparent or translucent material having the edges thereof overlapping a short distance. A pivot pin 3 extends through these plates and is anchored in place so that the plates can be moved around this pivot to assume different positions with respect to each other. A pair of pins 4 and 5 are attached respectively to the plates 1 and 2 at right angles thereto and at equal distances from the pin 3. Inscribed lines 6 and 7 on plates 1 and 2 join the center lines of pins 3, 4 and 3, 5 respectively. Lines 8 and 9 extend from the center points of the lines 6 and 7 and are perpendicular thereto and extend downwardly to the ends of the plates 1 and 2. Notches 10 and 11 may be provided along the inner edges of the plates 1 and 2 to accommodate extreme positions of the pins 4 and 5 when the plates are turned on pin 3.

Another pair of pins 12 and 13 like pins 4 and 5 is provided but they are located closer to the pin 3 and above the lines 6 and 7. They are provided for finding the center points of faces of smaller tubes while using the same plates 1 and 2. Lines 14 and 15 join the center line of pin 3 to the center lines of the pins 12 and 13. Lines 16 and 17 extend perpendicular to the lines 14 and 15 from the center points of these lines for the same purpose as lines 8 and 9.

Each pin may be attached to a plate by providing it with a reduced end 20 which passes through a hole 21 in the plate. The pin 3 passes through mating holes 21 in the overlapping plates 1 and 2. After the pins are passed through the plates, washers 22 are slipped over them and the ends of the pins are upset as indicated at 23 to keep them rigidly in place.

The sides of the pins 12 and 13 may be flattened or cut away as indicated at 26 to prevent them from striking the smaller size tubes when locating the center points of the larger tubes.

Figure 4:
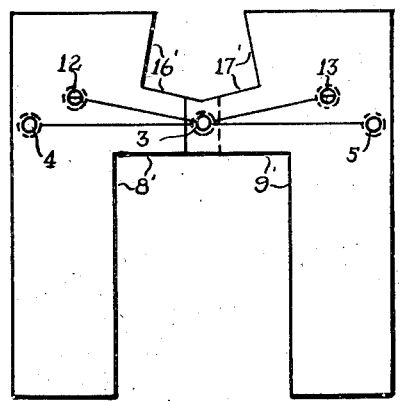
Fig. 4 is a modification.
Figure 3:
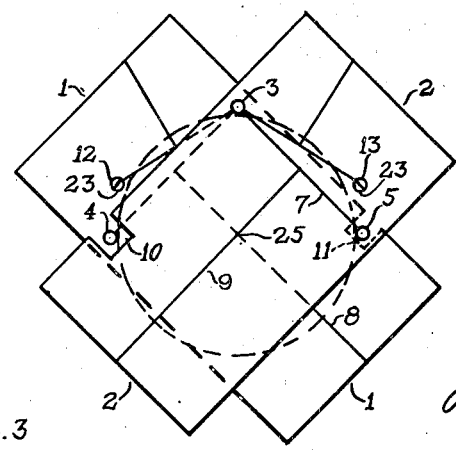
Fig. 3 is a plan view with parts in different positions.

In the modification shown in Fig. 4 the plates 1 and 2 are cut out along the lines 8', 9' and 16', 17' without interfering with the operation of the device. In this modification the points at which the edges 8' and 9' or edges 16' and 17' cross show where the center line of the face of the tube is when the plates are turned to cause the pins 3, 4 and 5 or 3, 12 and 13 to contact with the rim of the end of the tube. The cut-out portions make the surface of the tube accessible so that the center point, where the edges 8' and 9' or edges 16' and 17' cross, can be marked on the rounded surface that is tested.

The operation is as follows:

The tubes to be tested are placed in a horizontal or approximately horizontal position. The plates 1 and 2 are then brought up to the large end of the tubes so that the pins 3, 4 and 5 extend toward the small end of the tube. The lower ends of the plates 1 and 2 are then turned toward each other until the three pins 3, 4 and 5 contact with the rounded edge of the tube, thereby supporting the device on the tube. Turning the plates around the pivot pin 3 until the pins 4 and 5 touch or rest upon the rim of the tube causes the lines 8 and 9 to cross each other at a point which is determined by the diameter of the tube. The crossing point of the lines 8 and 9 is indicated at 25 for a certain size of tube and is the exact center of the end of the tube so that it can be instantly ascertained whether the spot which represents the end of the cathode-ray beam on the screen of the tube is at the center of the end of the tube or not by comparing its position with that of the point where the lines 8 and 9 then cross each other.

When smaller tubes are being tested, using the pins 4 and 5, the cut-away portions 26 of the pins 12 and 13 do not interfere unless the tubes are too small to be tested by causing the pins 3, 4 and 5 to contact with the rim of the tube.

When still smaller tubes are to be tested the device is reversed so that the pins 3, 12 and 13 are made to contact with the rim of the tube being tested, whereupon the point at which the lines 16 and 17 cross each other indicates the center point of the end of the tube in the way described above.

What is claimed is:

1. A device for testing cathode-ray tubes to ascertain whether the electron ray spot is located at the center of the end of the tube, which comprises two parallel overlapping light transmitting plates pivoted to each other by a pin extending at right angles thereto, and a pin on each plate parallel to said first named pin said last named pins being spaced equal distances from said first named pin.

2. A device for testing cathode-ray tubes to ascertain whether the electron ray spot is located at the center of the end of the tube, which comprises two parallel overlapping light transmitting plates pivoted to each other by a pin extending at right angles thereto, a pin on each plate parallel to said first named pin said last named pins being spaced equal distances from said first named pin, and lines on said plates perpendicular to lines from said pivot pin to the other pins.

3. A device for testing cathode-ray tubes to ascertain whether the electron ray is located along the center line of the tube, which comprises two parallel overlapping light transmitting plates pivoted to each other by a pin extending at right angles thereto, a pin on each plate parallel to said first named pin said last named pins being spaced equal distances from said first named pin, and a line on each plate perpendicular to and extending from the center of a corresponding line from said pivot pin to said parallel pins.

4. A device for testing cathode-ray tubes to ascertain whether the electron ray is located along the center line of the tube, which comprises two parallel overlapping light transmitting plates pivoted to each other by a pin extending at right angles thereto, a pin on each plate parallel to said first named pin said last named pins being spaced equal distances from said first named pin, and a slot in the edge of each plate for a pin of the other plate to enter.

5. A device for testing cathode-ray tubes to ascertain whether the electron ray is located along the center line of the tube, which comprises two parallel overlapping light transmitting plates pivoted to each other by a pin extending through the overlapping portions of said plates at right angles thereto, a plurality of pins attached to each one of the respective plates, all of said pins extending parallel to said first named pin, and a slot in one edge of each plate positioned to receive one of said pins that is on the other plate.

6. The device of claim 5, in which the pins of the respective pairs of pins are equidistant from said first named pin.

7. The device of claim 5, in which the pins of the respective pairs of pins are equidistant from said first named pin but the pins of one pair are closer to said first named pin than the pins of the other pair are.

JOSEPH MICHAEL BURKE.